United States Patent
Hamann et al.

(10) Patent No.: US 6,516,357 B1
(45) Date of Patent: Feb. 4, 2003

(54) SYSTEM FOR ACCESSING VIRTUAL SMART CARDS FOR SMART CARD APPLICATION AND DATA CARRIER

(75) Inventors: Ernst-Michael Hamann, Boeblingen (DE); Thomas Schaeck, Achern (DE); Robert Sulzmann, Hartgerfingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,282

(22) Filed: Aug. 26, 1999

(30) Foreign Application Priority Data

Feb. 8, 1998 (DE) .......................................... 198 38 628

(51) Int. Cl.[7] ................................................ G06F 3/00
(52) U.S. Cl. ............................ 710/2; 710/62; 710/102; 711/203; 713/201; 709/229
(58) Field of Search ................................ 710/2, 15, 62, 710/63, 64, 65, 68, 100, 101, 102, 201, 73, 104, 36; 709/202, 229, 225; 713/200, 201; 711/6, 203

(56) References Cited

U.S. PATENT DOCUMENTS 5,590,200 A  * 12/1996  Nachman et al. ............. 380/46

(List continued on next page.)

FOREIGN PATENT DOCUMENTS

| EP | 0923057 | 6/1999 |
|---|---|---|
| EP | 0 936 530 | 8/1999 |
| WO | WO 96/30857 | 10/1996 |
| WO | WO 97/10562 | 3/1997 |
| WO | WO 98/07092 | 12/1998 |
| WO | WO 01/08113 | 2/2001 |

OTHER PUBLICATIONS

Rinaldo Di Giorgio, Java World, XP–002198417, 1998, pp. 1–10, Smart Cards and the Opencard Framewwork.
Naomaru Itoi et al., Citi Technical Report, Xp–002198418, 1998, pp. 1–11, SCFS: A Unix Filesystem for Smartcards.
European Search Report, EP99115810, May 8, 2002, pp. 1–2.

*Primary Examiner*—Jeffrey Gaffin
*Assistant Examiner*—Rijue Mai
(74) *Attorney, Agent, or Firm*—Connolly, Bove, Lodge & Hutz LLP.

(57) ABSTRACT

The present invention describes an improved communication architecture for smart card systems and an improved procedure for communication of the smart card applications using protected data carriers, particularly in the case where smart cards or smart card readers cannot be used. The improved communication architecture has a common virtual smart card interface between the respective smart card applications and the modules which facilitate access to the protected data carriers (smart cards). The modules allow access to either physical smart cards, virtual software smart cards or hardware smart cards. The common virtual smart card interface means that the application is completely independent of the respective module or the respective data carrier. Alternatively, the improved communication architecture additionally contains a virtual smart card adapter which communicates over the common virtual smart card interface with the respective smart card application. The different modules are attached to the smart card adapters and selected statically or dynamically by the smart card application. Virtual software smart cards which functionally imitate true physical smart cards can be linked over the virtual smart card adapter to communicate with a smart card application. This procedure is then particularly suited for when the smart card is lost or defective, the smart card reader cannot function, or for testing new smart card technologies.

32 Claims, 4 Drawing Sheets

U.S. PATENT DOCUMENTS

| | | | |
|---|---|---|---|
| 5,825,876 A | * 10/1998 | Peterson, Jr. | 380/4 |
| 5,854,891 A | * 12/1998 | Postlewaite et al. | 713/202 |
| 5,983,003 A | * 11/1999 | Lection et al. | 709/202 |
| 6,021,497 A | * 2/2000 | Bouthillier et al. | 713/202 |
| 6,216,227 B1 | * 4/2001 | Goldstein et al. | 713/172 |
| 6,247,644 B1 | * 6/2001 | Horne et al. | 235/380 |
| 6,308,270 B1 | * 10/2001 | Guthery | 713/200 |
| 6,360,952 B1 | * 3/2002 | Kimlinger et al. | 235/492 |

* cited by examiner

SYSTEM FOR ACCESSING VIRTUAL SMART CARDS FOR SMART CARD APPLICATION AND DATA CARRIER

BACKGROUND OF THE INVENTION

The present invention concerns an expanded smart card architecture for communicating between the smart card application and a smart card or a virtual smart card in case the smart card or the smart card reader, for whatever reason, is not present or cannot be used.

With the introduction of new technology and programs which necessitate the use of smart cards, the problem of short term availability of smart card readers often arises. Workstations for users must be converted to new smart card readers which conform to this technology. This is often very laborious from a technical point of view and, particularly in large companies, takes a great deal of time. The result of this is that new technologies or programs have to be operated together with old technologies and programs in a transitional phase. This is both costly and labor intensive.

Defective smart card readers prevent transactions using the smart card. This can be economically disadvantageous both for the smart card owner as well as for the operator of the smart card reader, depending on the field of use.

In the case of a lost smart card, the owner is prevented from working with the smart card until a new card is issued. In certain cases, e.g. during long trips away, this can lead to problems for the owner. This is increasingly the case because many business activities require extensive use of the smart cards.

SUMMARY OF THE INVENTION

It is therefore the object of the present invention to produce a procedure and system which is able to avoid the above mentioned disadvantages.

The advantages of the present invention are that a virtual software smart card can be used instead of a physical smart card. The virtual software smart card represents a software solution and models the functions of a physical smart card on a user's personal computer. New smart card designs may be tested using the virtual software smart card which simulates a hardware smart card. The creation of a virtual software smart card simulating a new smart card design is less time consuming and thus also cheaper than creating an actual smart card, making unnecessary smart card prototypes for testing the newly developed smart cards. In the case of loss of the physical smart card, the authorized user can download a virtual software smart card using a diskette, or over the Internet, into his system and continue to work using this virtual software smart card until a new smart card is issued.

Organizations and companies can use new smart card technology by making available virtual software smart cards, without all the systems having to be equipped with new smart card readers. For smart card manufacturers, the advantage is that new technologies can be tested in the later application environment before components (such as cryptocoprocessors, large memories, etc.) are available.

By introducing a common virtual smart card interface and a virtual smart card adapter, communication between the smart card application and the modules of the virtual smart card adapter is completely independent. For the smart card application, it makes no difference with which module of the virtual smart card adapter it is communicating. Modules routines access a physical smart card, a virtual software smart card or a hardware smart card with the functionality of a smart card. Changes to the modules or the virtual smart card adapter do not require any adaptation of the respective smart card application due to the common virtual smart card interface to the applications.

DESCRIPTION OF THE DRAWINGS

The present invention will be explained in more detail using a preferred embodiment example and figures where.

DESCRIPTION OF THE PREFERRED EMBODIMENT

Figure 1:
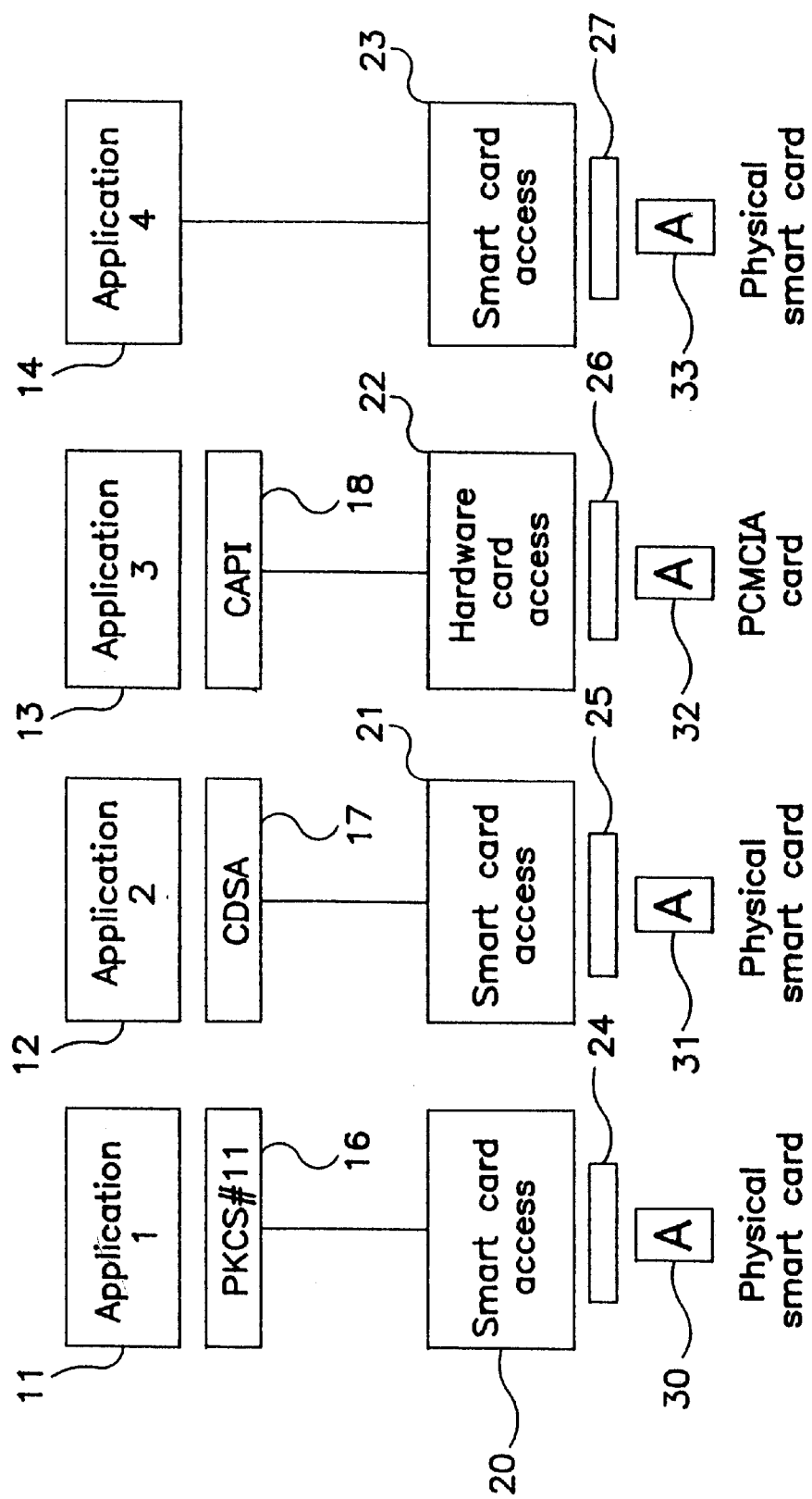
FIG. 1 shows a communication architecture between smart card applications and smart cards or smart card modules.

FIG. 1 describes the prior art communication architecture between different smart card applications 11–14 and different smart cards 30–33. The communication architecture of FIG. 1 is a system having various software components stored on a personal computer 10. Thus, it is possible using standard interfaces between the computer 10 and the various physical smart cards 30, 31, 33, and PCMCI cards 32, to carry out a session between the applications 11–14 and the smart cards 30–33.

The identification of one of the smart card 30–33 connected through a reader 24–27 connected to a computer 10 is carried out by one of the applications 11–14. The different applications communicate with specific smart card access routines over special interfaces 16–18 (PKCS #11, CDSA, CAPI). The respective smart card access routines 20–23 are either a part of the respective application 11–14, or form a separate software component of a user's computer 10. For different smart cards 30–33, with different operating systems or different data structures, they have their own access routines 20–23. Each new smart card, or change to the operating system software or data structure of a smart card 30–33, requires an adaptation of the respective access functions.

Figure 2:
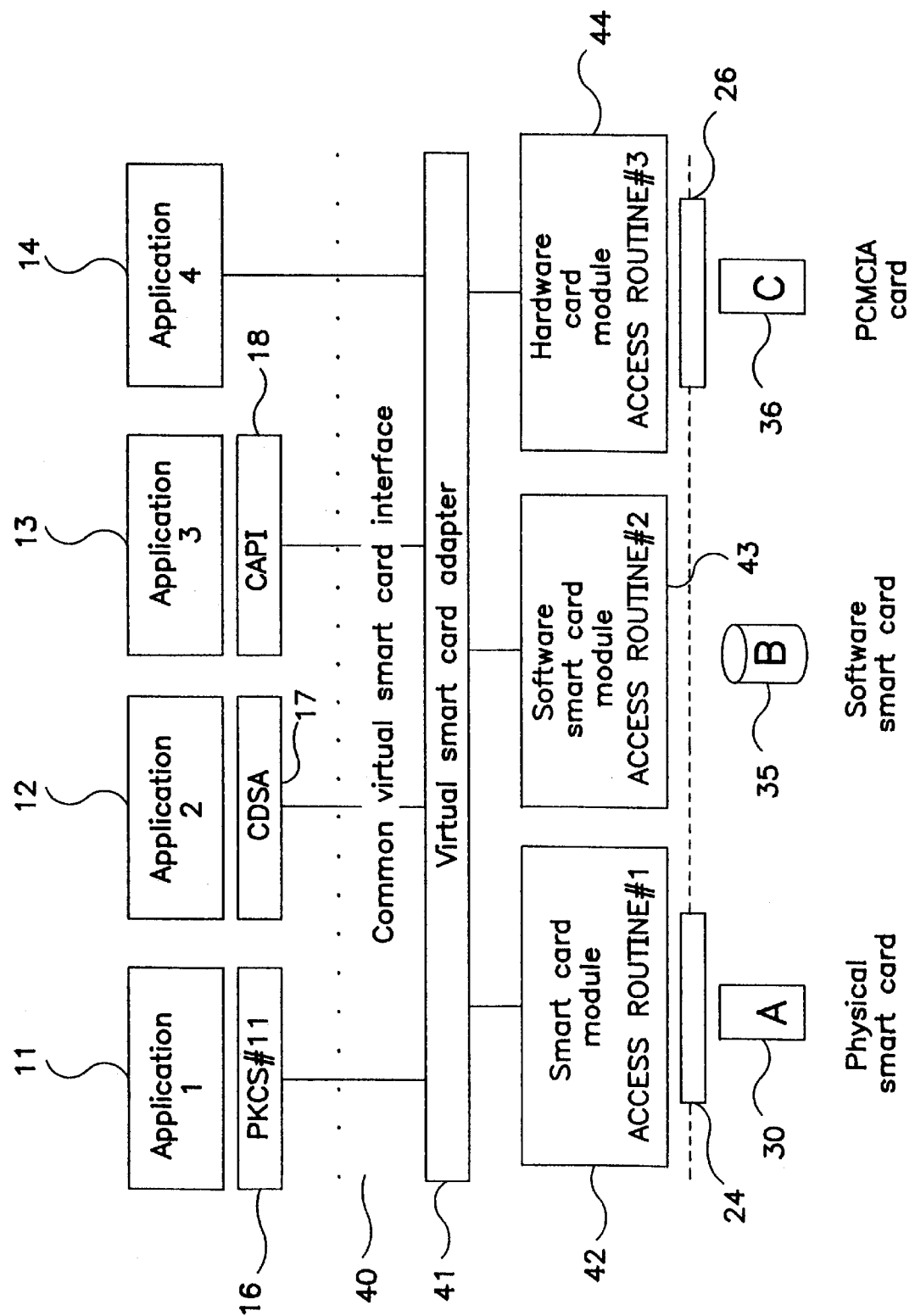
FIG. 2 shows the communication architecture in accordance with the invention between different smart card applications and different types of smart cards; carriers.

FIG. 2 describes the communication architecture in accordance with the invention for providing a session between the different smart card applications 11–14 and data carriers of different smart cards 30–36. The executable code is read from a computer readable medium into the internal memory of computer 10. As was the case in FIG. 1, the components of FIG. 2 are implemented as software executable instructions stored within a personal computer 10. FIG. 2, however, provides several advantages over the prior art system of FIG. 1, in that a software smart card 35, i.e., a computer program which may either be stored on the personal computer 10 from a floppy disk or CD ROM, or downloaded from a network such as the Internet, can simulate all the functions of a smart card. The software smart card 35 is accessed through a software smart card module 43, using access routines similar to those of existing smart card modules 42 and 44.

Different applications 11–14 communicate over a common virtual smart card interface 40 with any of the smart card modules 42–44 and their connected smart card data carriers. Applications 11 and 12, for example, connect through standardized interfaces 16 and 17 such as PKCS #11, and CDSA, and application 13 connects through a standardized interface 18 such as CAPI. The different standard interfaces 16–18 (PKCS #11, CDSA, CAPI) use the common virtual smart card interface 40. Application 14 connects directly to the common virtual smart card interface 40.

The common virtual smart card interface 40 describes a set of functions to access data on a smart card 30, 36 or software smart card 35, and perform any cryptographic functions in transferring data from a smart card or software smart card. Among the functions described by the virtual smart card interface 40, which are to be implemented by the smart card adapter 41 are the following:

Initialize (i.e., get data concerning configured readers 24–26 connected to the computer 10);

List slots (list attached readers, software smart cards, PCMIA connections, etc.);

Attach card (i.e., establish a connection to the smart card and set up related modules for communicating between an application and the smart cards);

Detach smart card (remove connection to the card);

Get slot status (i.e., connection status, card presence or absence for each reader 24–26 or software smart card 35 implemented in the system); and Get information regarding the reader 24–26 and its status.

Additionally, functions which are to be implemented by the individual smart card modules 42–44 for supporting a connection to the respective smart card are described in the virtual smart card interface 40. Thus, an application connecting to the smart card can access the following functions through the virtual smart card interface 40:

Get card information (returns information on card type, size);

Initialize PIN, (set Personal Identification Number, password);

Change PIN;

Verify PIN;

Select file (selects file to work with);

Read file;

Update file;

Initialize session (initializes a session to the card);

Allocate key object (allocates space for a key object);

Free key object (frees space for a key object);

Read key information;

Update key information;

Import key (import private key or public key);

Generate signature (sign data);

Verify signature (verify signature of data); and

Generate key pair (create keys inside the card).

The common virtual smart card interface 40 also checks the calls, or requests received from the smart card applications 11–14. An execution dispatcher implemented in the common virtual smart card interface 40 selects the access routine, which in the case of the software smart card 35, is in the software smart card module 43, and generates the low level commands for the specifically selected device. The device dispatcher of the common virtual smart card interface 40 then issues a call from the respective application to the software smart card 35 for data on the smart card 35 data carrier.

The virtual smart card adapter 41 provides the access routine for the software smart card module 43. The access routine of the selected smart card module is accessed for the specifically connected device which, in accordance with the present invention, would be the software smart card 35.

The virtual smart card adapter 41 is a software module, and offers a uniform interface for all applications to the different smart card types 30, 35 and 36. Different types of smart card modules (smart card modules 42, software smart card modules 43, hardware smart card modules 44) can be attached to the virtual smart card adapter 41. The applications 11–14 can interrogate the access routines of modules 42–44 through the virtual smart card adapter 41, and communicate with a selected module. The selection of the respective module 42–44 can be carried out statically or dynamically by each application 11–14. In the case of dynamic linking of a smart card module 42–44, over the Internet for example, the virtual smart card adapter 41 checks the identity and authenticity of the module 42–44, i.e. whether the module has been created by an authorized entity and has not been since modified. The module 42–44 transmits a digital signature which is tested by the virtual smart card adapter 41 on establishing the communication.

The virtual smart card adapter 41 can also be connected statically or dynamically to the application 11–14. In the case of dynamic connections, the smart card application checks the identity and authenticity of the virtual smart card adapter 41. Therefore, even the application can be linked dynamically to the virtual smart card adapter 41 over the Internet. Also, in this case, the identity and authenticity of smart card applications 11–14 must be checked. The check here on authenticity is also carried out using a digital signature.

Alternatively, the smart card application 11–14, the virtual smart card adapter 41 and the smart card modules 42–44 attached to it can be linked statically in the user's computer by introducing these components from a computer readable disk. In this case, a digital signature is unnecessary.

Modules 42–44 provide access routines to the data objects stored in a smart card 30, 35, 36. The data objects can, for example, be stored in a physical smart card 30, a (virtual) software smart card 35, or on a hardware smart card 36. Cryptographic functions are stored either in the module 42–44 or on a physical smart card 30, or a hardware smart card 36 (e.g. PCM/CIA card). In the case of a virtual software smart card 35, the cryptographic functions are a part of the software smart card 35. Cryptographic functions include encrypting the transmissions between the application and the software smart card which are similar to those which are carried on between an actual physical smart card and an application. The protocol for the cryptographic functions in the software of smart card 35 are identical to those of the physical smart card, except they are represented by instructions executed by the computer 10, rather than by an external physical smart card having its own processor. Access to private data on a physical smart card 30, or hardware smart card 36, is protected by a password (e.g. PIN).

With the virtual software smart cards 35, private data is additionally encoded with the support of the password. The codes of the (virtual) software smart cards 35 are additionally protected from being read out.

Figure 3:
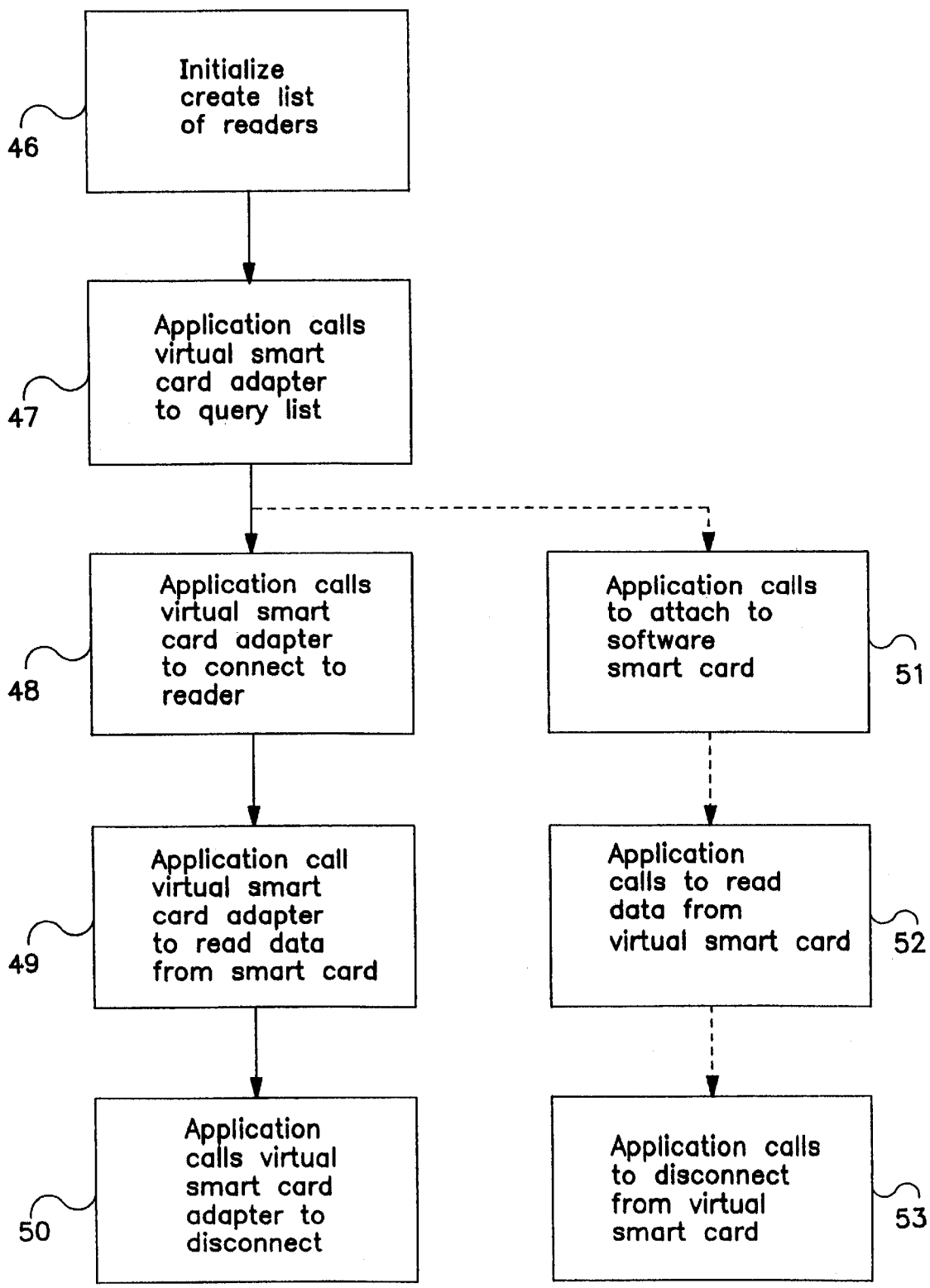
FIG. 3 illustrates the process of an application which communicates with either a smart card or a software smart card.

A sample process which illustrates the connection of an application 11–14 to a connected physical smart card via its reader 24, 26 of FIG. 2, or a virtual smart card 35 stored in computer memory is illustrated by the process of FIG. 3. Referring now to FIG. 3, the process begins when the virtual smart adapter 41 is initialized, and builds a list of installed readers queried from the operating system, as well as the available software smart cards 35 which are located in a directory on the computer 10 hard drive in step 46. Once initialized, an application 11–14 calls the virtual smart card adapter 41 to query which readers are available in step 47, and the virtual smart card adapter 41 returns a reader list, indicating the card presence as well as software smart cards which may be available in the system.

An application may call the virtual smart card adapter to attach the application to any one of the identified cards in the reader in step 48. The virtual smart card adapter then issues the respective low level commands to a card module 42–44 to load the related module for communicating with the selected software card.

The application calls in step 49 the virtual smart card adapter 41 to read data from the selected smart card. The associated module 42–44 assembles the commands for communicating with the respective smart card, sends the commands and then returns data from the smart card to the application 11–14. When the transaction is completed, virtual smart card adapter 41 releases the connection to the smart card in step 50.

The same essential procedure can be implemented for establishing a session between an application 11–14 and a software smart card 35 stored in the hard drive memory of computer 10. In this instance, steps 48–50 are replaced by steps 51–53. The application in step 51 calls the virtual smart card adapter 41 and begins a connection sequence to the software smart card 35. The related module 43 for supporting the software smart card 43 is loaded for execution. The application in step 52 calls the virtual smart card adapter 41 to read data from the software smart card 35. The virtual smart card adapter 41 passes the request to the selected module 43, and the module can then read data from the hard disk, representing a data carrier from the software smart cards, decrypt the data and return the data to the respective application 11–14.

Step 53 ends the session from an application call issued by the virtual smart card adapter 41 to detach from the software smart card.

Figure 4:
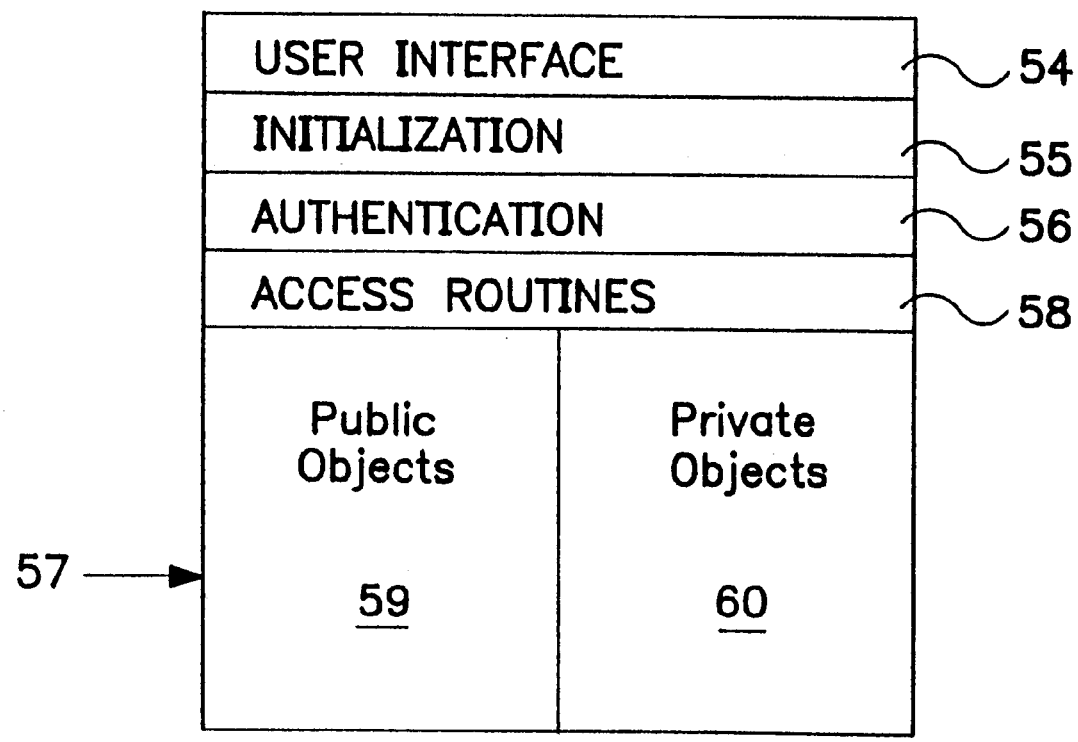
FIG. 4 shows the functional organization of the virtual smart card.

Several standardized virtual software smart card types 35 can be developed and stored on a storage medium such as a floppy disk or CD ROM read by a user's computer 10 and stored on the hard drive. The virtual software smart cards 35 can also be distributed over the Internet as a data file to users. Virtual software smart cards 35 have a generic structure shown in FIG. 4, representing the method of functioning of a physical smart card defined by a set of stored objects and do not contain any user-specific data. Therefore, they need to be initialized/personalized by the user.

The user interface routine 54 asks the user, for example, which virtual software smart card type is required. Smart card types cover, for example, signature cards, access cards or data cards. The user interface routine 54 asks the user to determine a password or to accept or change an existing password. The virtual software smart card 35 generates a code from the password. The initialization routine 55 of the virtual software smart card 35 preferably precedes an authentication routine 56 which establishes whether changes have been made in the virtual software smart card 35 during downloading of the virtual software smart card 35 from one system to the other. The virtual software smart card 35 is preferably equipped with a user interface routine 54 for initializing the virtual smart card 35.

From the information requested, a memory area 56 is established on the hard disk of the user for storing public data objects 59, and a memory area for storing private data objects 60. These functions of the virtual software smart card 35 are carried out by component of the virtual software smart card such as the access routines 58, all of which are stored on the computer 10 hard disk. The public data objects 59 are freely accessible; private data objects 60 can only be accessed using a code/password. The user is thus able to work using the virtual software smart card.

The virtual smart card adapter 41 can be a component of the virtual software smart card 35 or can represent its own software component which is available together with the virtual software smart card 35.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A computer readable medium containing instructions for simulating communications with a smart card comprising:

instructions for creating a virtual smart card adapter which links a smart card application to one of a plurality of smart card modules;

instructions for creating a plurality of smart card modules having access routines for communication with a protected smart card data carrier in response to commands from said virtual smart card adapter; and instructions for creating a software smart card which simulates a smart card, said instructions allocating memory space on a hard drive of said computer for storing public and private objects of a smart card, and which establish a communications session with said application through said smart card modules.

2. The computer readable medium of claim 1, wherein said instructions for creating said smart card modules provide access routines for smart cards connected through a reader to a computer executing said instructions.

3. The computer readable medium according to claim 2, further comprising: instructions for creating a common virtual smart card interface which describes functions executed by said smart card adapter for accessing data on said smart cards.

4. The computer readable medium according to claim 2, wherein said instructions which create said smart card adapter create a list of readers which receive said smart cards prior to linking an application to one of said smart cards.

5. The computer readable medium according to claim 3, wherein said common virtual smart card interface includes a dispatcher, which in response to a request from said application, selects an access routine in said virtual smart card adapter for establishing a connection with a selected smart card.

6. Communication architecture for the exchange of information between a smart card application and a protected data carrier with public data objects, and private data protected against access, comprising:

a) a virtual smart card adapter for linking said smart card application to one of a plurality of smart card modules which access said protected smart card data carriers; and b) a plurality of smart card modules having, access routines for communicating with a protected smart card data carrier in response to commands from said virtual smart card adapter.

7. Communication architecture in accordance with claim 6, wherein the smart card module is statically connected to the smart card adapter.

8. Communication architecture in accordance with claim 6, wherein the smart card module is connected dynamically to the smart card adapter.

9. Communication architecture in accordance with claim 8, wherein the smart card module is connected dynamically with the smart card adapter over the internet.

10. Communication architecture in accordance with claim 8, wherein the smart card module has an identity which is checked by the smart card adapter.

11. Communication architecture in accordance with claim 8, wherein the authenticity of the smart card module is checked by a digital signature.

12. Communication architecture in accordance with claim 6, wherein the smart card adapter is connected statically with the smart card application.

13. Communication architecture in accordance with claim 6, wherein the smart card adapter is connected dynamically to the smart card application.

14. Communication architecture in accordance with claim 13, wherein the smart card adapter is connected dynamically over the internet to the smart card application.

15. Communication architecture in accordance with claim 13, wherein the smart card adapter has its identity and/or authenticity checked by the smart card application.

16. Communication architecture in accordance with claim 13, wherein the authenticity of the smart card adapter is checked using a digital signature.

17. Communication architecture in accordance with claim 6, wherein the smart card module is connected to the smart card adapter by instructions in the smart card application program.

18. Communication architecture in accordance with claim 6, wherein the protected data carrier is one of a physical smart card, a virtual software smart card or a hardware smart card with the functionality of a smart card.

19. Communication architecture in accordance with claim 13, wherein the virtual software smart card is initialized and personalized.

20. Communication architecture in accordance with claim 6, wherein said data objects stored on the data carrier as a virtual software smart card, and access to the data objects by the smart card module are through the virtual smart card.

21. Communication architecture in accordance with claim 20, wherein cryptographic functions for coding and encoding data are included on the virtual software smart card.

22. Communication architecture for the exchange of information between a smart card application and a smart card comprising:

a) a virtual software smart card having a data carrier on which data objects with private and public data can be stored, and having cryptographic functions for filing, reading and writing data objects on said data carrier whereby private data can be protected against access using the virtual software smart card; and b) a module having access routines for communicating with said protected data carrier and said smart card application.

23. Communication architecture in accordance with claim 22, wherein the smart card module is able to be connected statically or dynamically to the smart card application.

24. Communication architecture in accordance with claim 23, wherein in the case of dynamic connection of the smart card module with the smart card application, its identity and/or authenticity is checked using a digital signature.

25. Communication architecture in accordance with claim 24, wherein the virtual software smart card is connected statically or dynamically to the smart card module.

26. Communication architecture in accordance with the claim 25, wherein the virtual software smart card checks the identity and/or authenticity of the smart card module using a digital signature.

27. Communication architecture in accordance with claim 26 further comprising a virtual smart card adapter is integrated with an interface common to all smart card applications.

28. Communication architecture in accordance with claim 27, wherein the smart card adapter is connected dynamically to the smart card application.

29. Communication architecture in accordance with claim 28, wherein the smart card adapter is connected dynamically over the internet to the smart card application.

30. Communication architecture in accordance with claim 28, wherein the smart card adapter identity and/or authenticity is checked by the smart card application.

31. Communication architecture in accordance with claim 27 that modules which can be connected to the smart card adapters are able to be interrogated, selected and connected over the smart card application program.

32. A method for implementing virtual software smart cards which functionally imitate physical smart cards, comprising:

a) selecting a virtual software smart card from a plurality of different virtual software smart cards stored in a storage medium;

b) entering a password to personalize the selected virtual software smart card; and c) generating private and public data objects on said storage medium using functions provided by said virtual software smart cards so that said private data objects are protected from unauthorized access.

* * * * *